United States Patent
Lee et al.

(10) Patent No.: US 8,432,986 B2
(45) Date of Patent: Apr. 30, 2013

(54) APPARATUS AND METHOD FOR RECEIVING SIGNALS IN MULTIPLE-INPUT MULTIPLE-OUTPUT WIRELESS COMMUNICATION SYSTEM

(75) Inventors: Joo-Hyun Lee, Suwon-si (KR); Sang-Boh Yun, Seongnam-si (KR); Yong-Soo Cho, Seoul (KR); Jae-Kwon Kim, Wonjoo-si (KR); Tae-Ho Im, Seoul (KR)

(73) Assignees: Samsung Electronics Co., Ltd., Suwon-si (KR); Chung-Ang University Industry-Academy Cooperation Foundation, Seoul (KR)

( * ) Notice: Subject to any disclaimer, the term of this patent is extended or adjusted under 35 U.S.C. 154(b) by 1519 days.

(21) Appl. No.: 12/004,112

(22) Filed: Dec. 20, 2007

(65) Prior Publication Data

US 2008/0152032 A1  Jun. 26, 2008

(30) Foreign Application Priority Data

Dec. 22, 2006 (KR) .................. 10-2006-0133155
May 23, 2007 (KR) .................. 10-2007-0050091

(51) Int. Cl.
*H04B 7/02* (2006.01)

(52) U.S. Cl.
USPC ............ 375/267; 375/260; 375/259; 375/261

(58) Field of Classification Search .................. 375/267, 375/260, 259, 341, 347, 262, 340; 714/794; 455/101, 522
See application file for complete search history.

(56) References Cited

U.S. PATENT DOCUMENTS

| | | | | |
|---|---|---|---|---|
| 5,446,747 | A * | 8/1995 | Berrou ......................... | 714/788 |
| 7,720,169 | B2 * | 5/2010 | Reuven et al. ................ | 375/267 |
| 7,848,461 | B2 * | 12/2010 | Vasil'evich et al. .......... | 375/340 |
| 7,920,657 | B2 * | 4/2011 | Kim et al. ..................... | 375/341 |
| 7,965,782 | B1 * | 6/2011 | Vijayan et al. ................ | 375/262 |
| 2006/0148506 | A1 * | 7/2006 | Hoo ............................... | 455/522 |
| 2007/0032206 | A1 * | 2/2007 | Hwang et al. ................ | 455/101 |
| 2007/0127589 | A1 * | 6/2007 | Hwang et al. ................ | 375/267 |
| 2007/0237272 | A1 * | 10/2007 | Hwang et al. ................ | 375/347 |

FOREIGN PATENT DOCUMENTS

| | | |
|---|---|---|
| KR | 1020040019906 A | 3/2004 |
| KR | 1020040077576 A | 9/2004 |
| KR | 1020060043724 A | 5/2006 |

\* cited by examiner

*Primary Examiner* — Shuwang Liu
*Assistant Examiner* — Helene Tayong

(57) ABSTRACT

An apparatus and method for receiving signals in a multiple-input, multiple-output (MIMO) wireless communication system is provided. A receiving end using as many as N Receive (Rx) antennas includes a first detector, as many as (N−2) $n^{th}$ detectors, and an $N^{th}$ detector. A signal detection technique of the present invention has a low complexity and a throughput similar to that of a Maximum Likelihood (ML) scheme in a Multiple-Input Multiple-Output (MIMO) wireless communication system using a Spatial Multiplexing (SM) scheme.

20 Claims, 12 Drawing Sheets

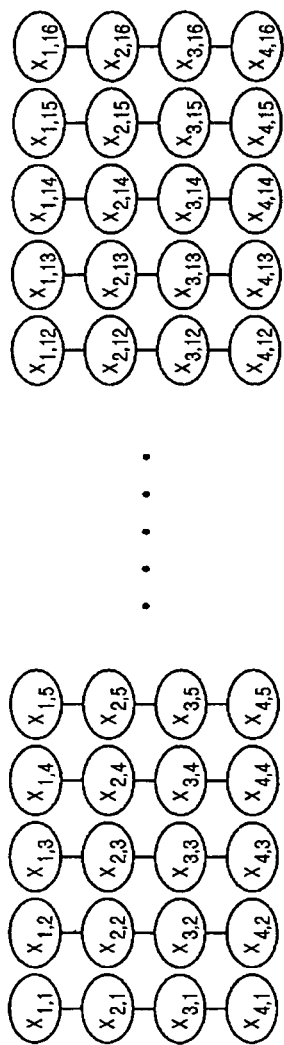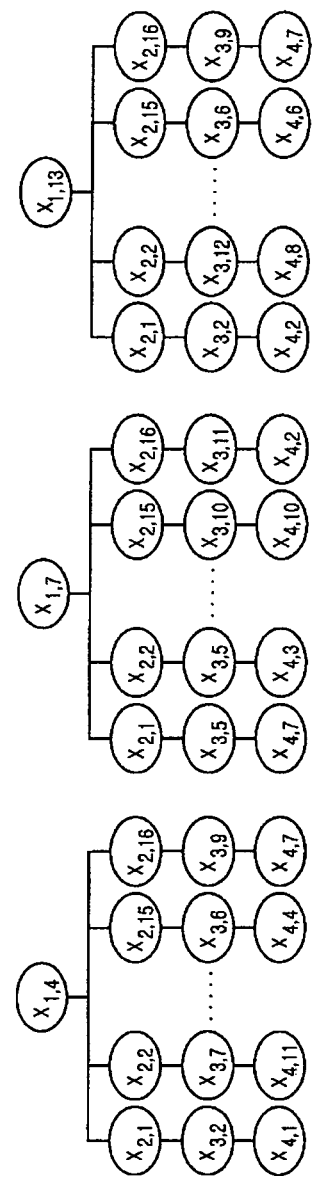

APPARATUS AND METHOD FOR RECEIVING SIGNALS IN MULTIPLE-INPUT MULTIPLE-OUTPUT WIRELESS COMMUNICATION SYSTEM

CROSS-REFERENCE TO RELATED APPLICATION(S) AND CLAIM OF PRIORITY

This application claims the benefit under 35 U.S.C. §119 (a) of Korean patent application filed in the Korean Intellectual Property Office on Dec. 22, 2006 and assigned Serial No. 2006-133155, and Korean patent application filed in the Korean Intellectual Property Office on May 23, 2007 and assigned Serial No. 2007-50091, the entire disclosure of which is hereby incorporated by reference.

TECHNICAL FIELD OF THE INVENTION

The present invention relates to an apparatus and method for receiving signals in a multiple-input, multiple-output (MIMO) wireless communication system. More particularly, the present invention relates to an apparatus and method in which signals are detected with a low complexity and a throughput similar to that of a Maximum Likelihood (ML) scheme in a MIMO wireless communication system using a spatial multiplexing (SM) scheme.

BACKGROUND OF THE INVENTION

With the recent rapid growth of the wireless telecommunication market, there has been a demand for a variety of multimedia services in a wireless environment. In particular, the size of data to be transmitted and the speed of data transmission are increasing. Therefore, there is an urgent need for a method of effectively using limited wireless resources. To address this issue, a new transmission technique using multiple antennas is required. By way of example, a multiple-input, multiple-output (MIMO) technique using multiple antennas is taken into account. According to the MIMO technique, both a transmission end and a receiving end use multiple antennas. In comparison with a system using a single antenna, the MIMO technique has an advantage in that a channel transmission capacity can increase in proportion to the number of antennas without having to allocate additional frequencies or transmission power. For this reason, the MIMO technique is recently regarded as a remarkable communication technique.

The MIMO technique is classified into spatial diversity scheme in which transmission reliability increases by obtaining a diversity gain corresponding to the product of a pair of transmit (Tx) and receive (Rx) antennas, a spatial multiplexing (SM) scheme in which a data transfer rate increases by simultaneously transmitting a plurality of signal streams, and a scheme in which the spatial diversity and the SM are combined.

When using the SM scheme, the transmitting end simultaneously transmits different pieces of information respectively through a plurality of transmit (Tx) antennas, thereby enabling fast data transmission. In this case, the different pieces of information are simultaneously transmitted by using the plurality of Tx antennas, and thus receive (Rx) antennas of the receiving end receive signals in which all transmit (Tx) signals are combined. Therefore, such multiplexed signals have to be de-multiplexed for the respective antennas in the receiving end. Examples of a method of detecting a signal for each antenna in a receiving end of a system using the SM scheme include a Zero Forcing (ZF) method, a Minimum Mean Square Error (MMSE) method, and an Order Successive Interference Cancellation (OSIC) method.

As a linear signal detection method, the ZF method and the MMSE method can be implemented with a relatively simple structure due to a low operational complexity, but provide poor throughput. When using the OSIC method, signals are sequentially detected according to a predetermined detection order, and these signals are removed from Rx signals. In comparison with the linear signal detection method, the OSIC method has a significant operational complexity, but shows superior throughput to the linear signal detection method. However, when compared with a Maximum Likelihood (ML) scheme showing the most optimal throughput, the OSIC method has a relatively low throughput.

In the ML scheme, all transmittable signal vectors are taken into account and thus a signal having the shortest Euclidean distance with respect to an Rx signal is selected. The ML scheme is an optimal method which is used as a reference when throughput is compared with other methods. However, an operational complexity exponentially increases in proportion to the number of Tx antennas and a modulation order. Therefore, it is difficult for a system to use the ML scheme in practice.

The signal detection method may be sphere decoding which shows the same throughput as the ML scheme. However, the sphere decoding cannot be easily implemented since it is difficult to obtain a radius of an initial sphere and an operational complexity required in the worst situation is very high. A QR Decomposition-M (QRD-M) scheme may also be used but has a demerit in that throughput may significantly vary depending on the number of candidate groups. The QRD-M scheme shows almost the same throughput as the ML scheme when the number of candidate groups is enough. However, the lesser the number of the candidate groups, the greater the deterioration in throughput. In addition, an operational complexity increases in proportion to the number of candidate groups.

In an SM-type receiver, it is known that superior throughput can be obtained when decoding is performed by delivering a soft decision value to a channel decoder instead of delivering a hard decision value of a coded bit to the channel decoder. The soft decision value input to the decoder uses a Log Likelihood Ratio (LLR) value as an estimation value of a modulation symbol that is transmitted through a channel. Therefore, the SM-type receiver requires not only a first algorithm for receiving signals with low complexity but also a second algorithm for generating an optimal LLR by using the first algorithm In general, when using the linear signal detection method (i.e., ZF and MMSE) and the non-linear signal detection method (i.e., OSIC), an operation for computing a square Euclidean distance is performed to generate an LLR. In addition, when using the sphere decoding, sufficient throughput improvement is achieved when many candidate groups of detection signals are provided. In this case, an operational complexity is great because the square Euclidean distance has to be obtained for each candidate group. In the case of using the QRD-M scheme, each bit has a probability value of 0 or 1 when an LLR is generated. However, such probability value cannot be obtained when a specific bit does not exist in a candidate group.

As such, many problems exist in the aforementioned signal detection methods proposed for the SM scheme. Therefore, there is a need for a method in which an LLR used in soft decision of a decoder is effectively generated and which has a low operational complexity and a throughput similar to that of the conventional ML scheme showing an optimal throughput.

SUMMARY OF THE INVENTION

To address the above-discussed deficiencies of the prior art, it is a primary aspect of the present invention to address at least the above-mentioned problems and/or disadvantages and to provide at least the advantages described below.

Accordingly, an aspect of the present invention is to provide a signal detection apparatus and method having a low complexity and a throughput similar to that of a Maximum Likelihood (ML) scheme in a multiple-input, multiple-output (MIMO) wireless communication system using a spatial multiplexing (SM) scheme.

Another aspect of the present invention is to provide a signal detection apparatus and method capable of effectively generating a Log Likelihood Ratio (LLR) in a MIMO wireless communication system using an SM scheme.

According to an aspect of the present invention, an apparatus for receiving signals by using as many as N receive (Rx) antennas in a multiple-input, multiple-output (MIMO) wireless communication system is provided. The apparatus includes: a first detector for estimating transmit (Tx) signal vectors respectively corresponding to first transmittable symbols that can be transmitted as a first symbol, for configuring a first candidate group including the first symbol according to a square Euclidean distance value between each of the Tx signal vectors and an Rx signal vector, and for providing the first candidate group to a second detector; as many as (N−2)th detectors for estimating Tx signal vectors respectively corresponding to combinations of a candidate group provided from an (n−1)th detector and each symbol that can be transmitted as an nth symbol, for configuring an nth candidate group including first to nth symbols according to the square Euclidean distance value between each of the Tx signal vectors and the Rx signal vector, and for providing the nth candidate group to an (n+1)th detector; and an Nth detector for forming Tx signal vectors by combining symbols that can be transmitted as an Nth symbol with a candidate group provided from an (N−1)th detector, and for computing the square Euclidean distance value between each of the Tx signal vectors and the Rx signal vector.

According to another aspect of the present invention, a signal detection method in a receiving end using as many as N Rx antennas in a MIMO wireless communication system is provided. The method includes the steps of: estimating Tx signal vectors respectively corresponding to symbols that can be transmitted as a first symbol, and configuring a first candidate group including the first symbol according to a square Euclidean distance value between each of the Tx signal vectors and an Rx signal vector; and estimating Tx signal vectors respectively corresponding to combinations of an (n−1)th candidate group and each symbol that can be transmitted as an nth symbol, and performing (n−2) times of operations for configuring an nth candidate group including first to nth symbols according to the square Euclidean distance value between each of the Tx signal vectors and the Rx signal vector; and forming Tx signal vectors by combining symbols that can be transmitted as an Nth symbol with an (N−1)th candidate group, and computing the square Euclidean distance value between each of the Tx signal vectors and the Rx signal vector.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the act should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 1A to 1D illustrate examples of selecting Transmit (Tx) symbols in a Multiple-Input Multiple-Output (MIMO) system according to the present invention;

DETAILED DESCRIPTION OF THE INVENTION

Figure 1C:
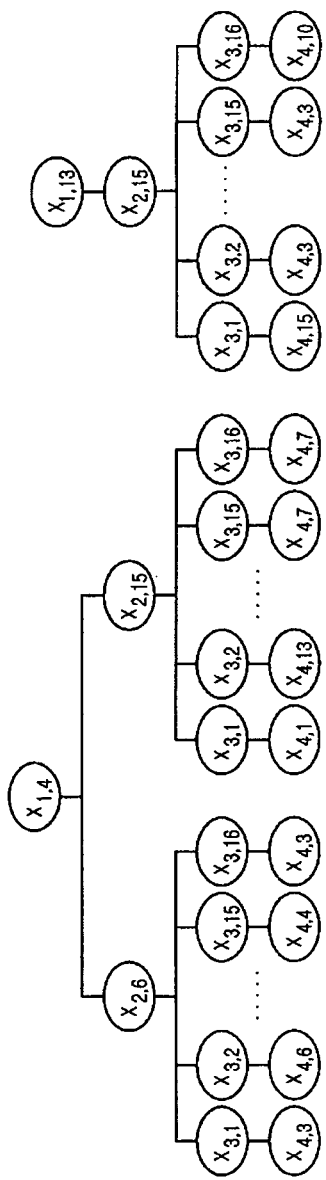

FIGS. 1A through 9C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

A signal detection technique of the present invention will be described hereinafter which has a low complexity and a throughput similar to that of a Maximum Likelihood (ML) scheme in a multiple-input, multiple-output (MIMO) wireless communication system using a spatial multiplexing (SM) scheme.

Between a transmitting end having as many as m transmit (Tx) antennas and a receiving end having as many as n receive (Rx) antennas, a channel, a transmit (Tx) signal, and a receive (Rx) signal are expressed by Equation 1 below:

$$H = \begin{bmatrix} h_{11} & h_{12} & \cdots & h_{1m} \\ h_{21} & h_{22} & \cdots & h_{2m} \\ \vdots & \vdots & \ddots & \vdots \\ h_{n1} & h_{n2} & \cdots & h_{nm} \end{bmatrix} \quad [\text{Eqn. 1}]$$

$$y = Hx + z$$

$$y = [y_1 \ y_2 \ \cdots \ y_n]^T$$

$$x = [x_1 \ x_2 \ \cdots \ x_m]^T$$

$$z = [z_1 \ z_2 \ \cdots \ z_n]^T$$

In Equation 1, $x_j$ denotes a Tx signal transmitted through a jth Tx antenna, $y_i$ denotes an Rx signal received through an ith Rx antenna, $h_{ij}$ denotes a channel gain between the jth Tx antenna and the ith Rx antenna, and $z_i$ denotes a noise introduced to the ith Rx antenna.

The ML scheme for detecting a signal with an optimal throughput is used in the MIMO wireless communication system using the SM scheme. According to the ML scheme, the receiving end calculates square Euclidean distances for all possible Tx signal vectors, and determines a Tx signal vector having the shortest square Euclidean distance as a signal that has been transmitted. When a channel, a Tx signal, and an Rx signal are expressed by Equation 1 above, the ML scheme can be expressed by Equation 2 below:

$$\begin{aligned} x_{ML} &= \operatorname{argmax} P(y\,|\,x) \\ &= \operatorname{argmax} \|y - Hx\|^2 \end{aligned} \quad [\text{Eqn. 2}]$$

In Equation 2, $x_{ML}$ denotes a Tx signal detected by using the ML scheme, $P(y|x)$ denotes a conditional probability that a Rx signal is y under the condition that a Tx signal is x, x denotes a Tx signal vector, y denotes an Rx signal vector, and H denotes a channel matrix between a transmitting end and a receiving end.

If the number of Tx and Rx antennas are respectively 4, and symbols modulated by 16-quadrature amplitude modulation (16-QAM) are detected by using the ML scheme as expressed by Equation 2 above, the number of times of performing a square Euclidean distance operation by the receiving end is 164. That is, in the ML scheme, an operational complexity exponentially increases in proportion to the number of Tx antennas.

In comparison with the ML scheme, implementation can be made with a relatively less operational complexity when a linear signal detection method is used. Examples of the linear signal detection method include Zero-Forcing (ZF) method and a Minimum Mean Square Error (MMSE) method. The ZF method advantageously provides a simple operation since an inverse-function of a channel is obtained, but disadvantageously produces a noise amplification phenomenon. The MMSE method reduces the noise amplification phenomenon produced when using the ZF method and thus shows a superior throughput to the ZF method in general. However, both the ZF method and the MMSE method show a significantly low throughput in comparison with the ML scheme. The ZF method can be expressed by Equation 3 below, and the MMSE method can be expressed by Equation 4 below:

$$y = H^+(Hx+n), H^+ = (H^*H)^{-1}H^* \quad [\text{Eqn. 3}]$$

In Equation 3, H denotes a channel matrix, x denotes a Tx signal vector, n denotes a noise, H+ denotes a pseudo reverse matrix of the channel matrix H, and H* denotes a conjugate transpose matrix of the channel matrix H.

$$y = W(Hx+n), W = (H^*H + \sigma^2 I_M)^{-1} H^* \quad [\text{Eqn. 4}]$$

Equation 4, H denotes a channel matrix, x denotes a Tx signal vector, n denotes a noise, H* denotes a conjugate transpose matrix of the channel matrix H, $\sigma^2$ denotes a noise power, and $I_M$ denotes a unit matrix having a size M.

In brief, the ZF method nullifies an interference signal by obtaining a pseudo reverse matrix of a channel response without consideration of noise. The MMSE method allows a demodulation signal to have a maximum signal-to-noise ratio (SNR) in consideration of noise.

Now, a method of detecting MIMO signals of the present invention will be described which has a throughput similar to that of the aforementioned ML scheme and has a significantly low operational complexity. It will be assumed hereinafter that a transmitting end and a receiving end respectively have four Tx antennas and four Rx antennas. However, the present invention may also apply to another transmitting/receiving end having different number of antennas.

A basic idea of the present invention will be described with reference to FIGS. 1A to 1D. In the following descriptions, it will be assumed that the number of Tx signal vectors included in a candidate group is 3, and a modulation order is 16.

A receiving end receives signals, in which Tx signals transmitted from four Tx antennas are combined, respectively through four Rx antennas. In this case, the receiving end detects one Tx signal for each of the four Rx antennas.

According to the present invention, the receiving end sorts columns of a channel matrix according to a channel size of each Tx antenna. The channel size is expressed by a norm value of each column and represents an Rx power size. Therefore, the receiving end can detect signals transmitted from the respective Tx antennas according to the sorting result. According to the detection result, it will be assumed that four symbols sequentially obtained are $x_1$, $x_2$, $x_3$, and $x_4$.

As shown in FIG. 1A, the receiving end estimates Tx signal vectors for all transmittable $x_1$ symbols (i.e., $x_{1,1}$ to $x_{1,16}$). That is, the receiving end assumes that the $x_1$ symbols as 16 transmittable symbols and thus estimates 16 Tx signal vectors. In this case, $x_2$, $x_3$, and $x_4$ symbols are estimated by using the MMSE-OSIC method which will be described below. The receiving end selects three Tx signal vectors from the 16 Tx signal vectors and then configures a candidate group of $x_1$ symbols. That is, the receiving end computes square Euclidean distances of an Rx signal with respect to the 16 Tx signal vectors, and then select the three Tx signal vectors having the smallest distance values. In addition, the receiving end generates LLRs of all bits of the $x_1$ symbols by using the 16 Tx signal vectors.

As shown in FIG. 1B, among the three Tx signals vectors selected from the 16 Tx signal vectors illustrated in FIG. 1A, the receiving end estimates Tx signal vectors by substituting all transmittable $x_2$ symbols (i.e., $x_{2,1}$ to $x_{2,16}$) in a state that the $x_1$ symbols are fixed. In this case, 16 transmittable $x_2$ symbols are estimated for the respective three $x_1$ symbols, and thus 48 Tx signal vectors are estimated. Further, the receiving end generates LLRs of all bits of the $x_1$ and $x_2$ symbols by using the 48 Tx signal vectors. At present, LLRs of the $x_1$ and $x_2$ symbols have been obtained.

The receiving end determines whether to update the LLRs of the $x_1$ symbols, that is, whether to update a value obtained in FIG. 1A to a value obtained in FIG. 1B. The update is necessary in the following two cases, and the receiving end may select either one of the two cases. In the first case, a currently generated LLR is less than a previously generated LLR. In the second case, there is a Tx signal vector which is included in currently estimated Tx signal vectors but is not included in previously estimated Tx signal vectors. The receiving end updates an LLR of a specific symbol according to the decision made by either one of the two cases.

In addition, the receiving end selects three Tx signal vectors having short square Euclidean distances with respect to the Rx signal from the 48 Tx signal vectors.

Thereafter, as shown in FIG. 1C, the receiving end estimates Tx signal vectors by substituting all transmittable $x_3$ symbols (e.g., $x_{3,1}$ to $x_{3,16}$) in a state where $x_1$ and $x_2$ symbols are fixed among the three Tx signal vectors selected from the 48 Tx signal vectors illustrated in FIG. 1B. In this case, the number of estimated Tx signal vectors is 48 because 16 $x_3$ symbols can be respectively transmitted for three $x_1$ and $x_2$ combinations. Further, the receiving end generates LLRs of all bits of the $x_1$ and $x_2$ symbols by using the 48 Tx signal vectors. At present, LLRs of the $x_1$, $x_2$, and $x_3$ symbols have been obtained. In the same manner as described above, the receiving end determines whether to update the LLRs of the $x_1$ and $x_2$ symbols. In addition, the receiving end selects three Tx signal vectors having the shortest square Euclidean distances with respect to the Rx signal among the 48 Tx signal vectors.

Figure 1D:
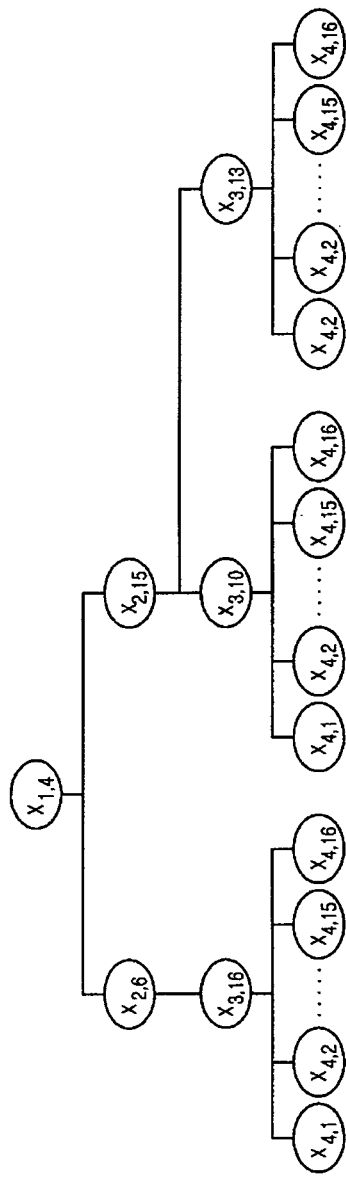

As shown in FIG. 1D, the receiving end estimates Tx signal vectors by substituting all transmittable $x_4$ symbols (i.e., $x_{4,1}$ to $x_{4,16}$) in a state that $x_1$, $x_2$, and $x_3$ symbols are fixed among the three Tx signal vectors selected from the 48 Tx signal vectors illustrated in FIG. 1C. In this case, the number of estimated Tx signal vectors is 48 because 16 $x_4$ symbols can be respectively transmitted for three $x_1$, $x_2$, and $x_3$ combinations. Further, the receiving end generates LLRs of all bits of the $x_1$ and $x_2$ symbols by using the 48 Tx signal vectors. At present, LLRs of the $x_1$, $x_2$, $x_3$, and $x_4$ symbols have been obtained. In the same manner as described above, the receiving end determines whether to update the LLRs of the $x_1$, $x_2$, and $x_3$ symbols. Thereafter, the receiving end performs soft decision decoding by using the LLRs of all bits of all symbols. If the receiving end performs hard decision decoding, the receiving end performs the hard decision decoding by using a Tx signal vector having the shortest square Euclidean distance with respect to the Rx signal among the 48 Tx signal vectors.

Now, a structure and operation of a receiving end for generating an LLR according to the aforementioned method will be described in detail.

Figure 2:
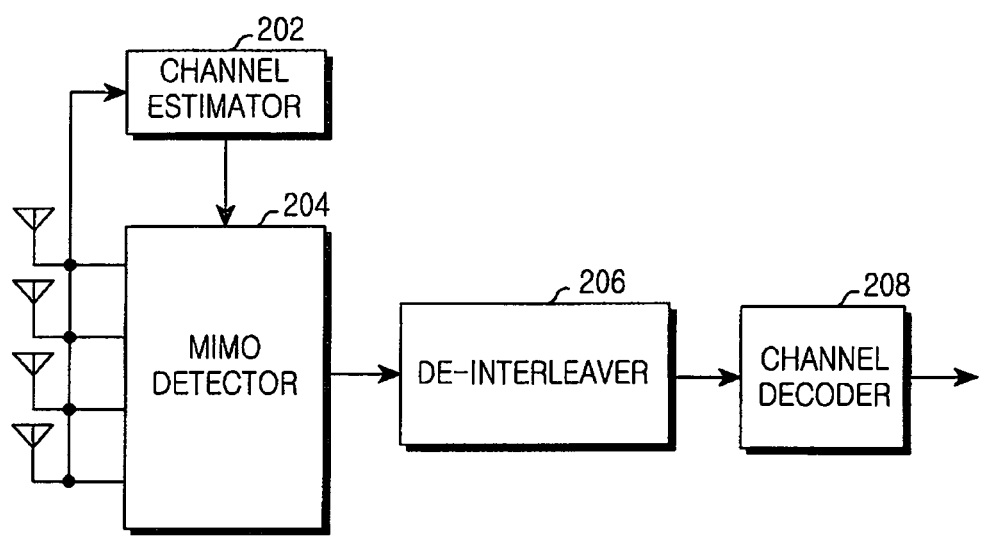
FIG. 2 is a block diagram illustrating a structure of a receiving end in a MIMO wireless communication system according to the present invention.

FIG. 2 is a block diagram illustrating a structure of a receiving end in a MIMO wireless communication system according to the present invention.

Referring to FIG. 2, the receiving end includes a channel estimator 202, a MIMO detector 204, a de-interleaver 206, and a channel decoder 208.

The channel estimator 202 estimates channels of Rx signals received through a plurality of Rx antennas and provides information on the estimated channels to the MIMO detector 204. The MIMO detector 204 demodulates the input Rx signal vectors by using the MIMO detection method of the present invention and then provides a plurality of LLRs of estimation Tx signals to the de-interleaver 206. A structure and operation of the MIMO detector 204 will be described below in detail with reference to the accompanying drawings.

The signals received through the plurality of Rx antennas are Radio Frequency (RF) signals. Although not shown, the RF signals received through the plurality of Rx antennas are respectively converted into baseband sample data and thereafter are input to the MIMO detector 204.

The de-interleaver 206 de-interleaves the LLRs provided from the MIMO detector 204 according to a predetermined rule. The channel decoder 208 performs soft-decision decoding on the LLRs provided from the de-interleaver 206, thereby restoring an information bit-stream.

Figure 3:
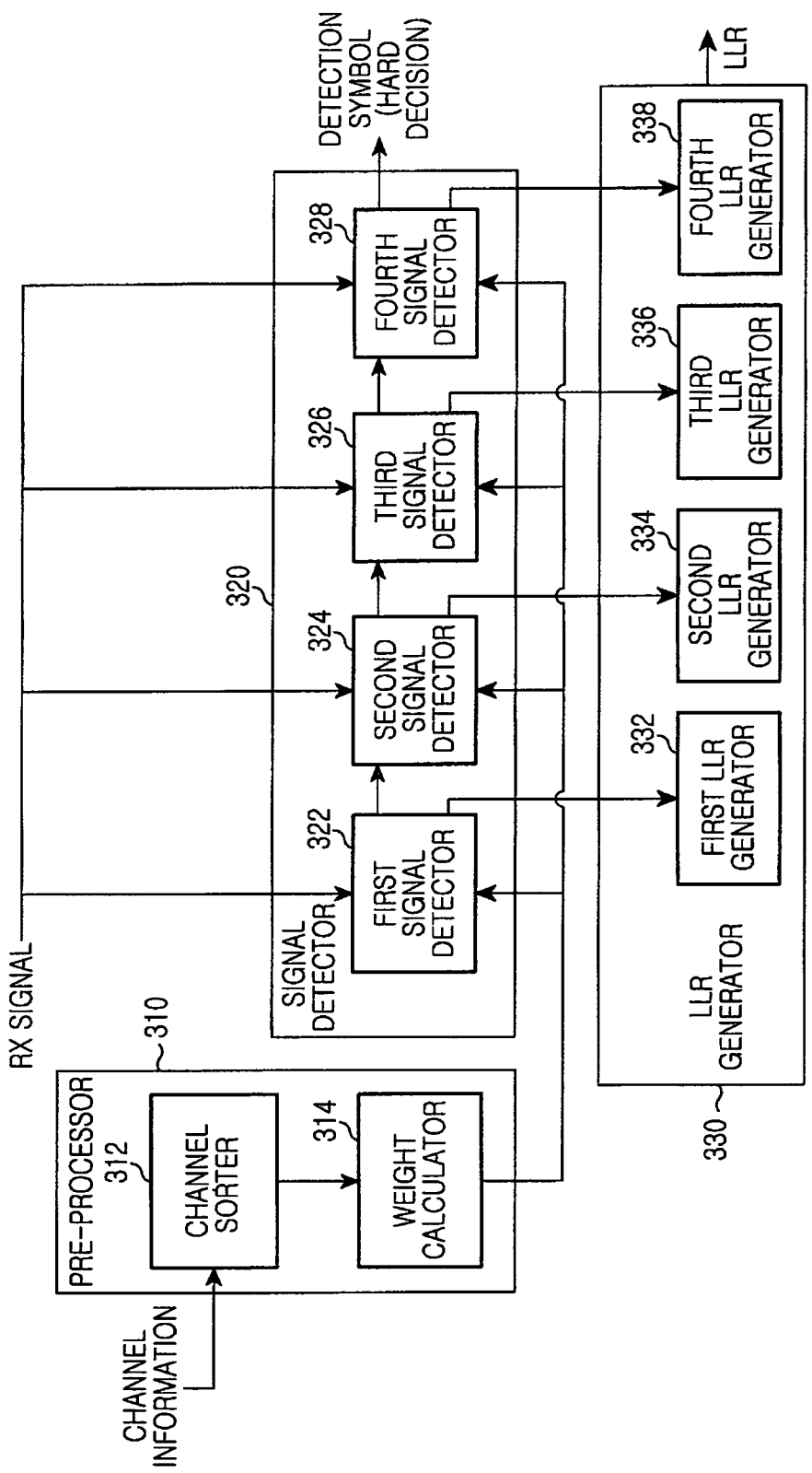
FIG. 3 is a block diagram illustrating a structure of a MIMO detector of FIG. 2.

FIG. 3 is a block diagram illustrating a structure of the MIMO detector 204 of FIG. 2.

Referring to FIG. 3, the MIMO detector 204 includes a pre-processor 310, a signal detector 320, and an LLR generator 330. The pre-processor 310 includes a channel sorter 312 and a weight calculator 314. The signal detector 320 includes a plurality of signal detectors 322 to 328. The LLR generator 330 includes a plurality of LLR generators 332 to 338.

A channel matrix, an estimated noise variance value, and an Rx signal vector are input to the MIMO detector 204. In the case of a hard decision system, a detected Tx signal vector is output by the MIMO detector 204. In the case of a soft decision system, an LLR of the detected Tx signal vector is output by the MIMO detector 204.

The channel sorter 312 calculates norm values for respective columns of an input channel matrix and sorts the columns according to the magnitude of the norm values. That is, the channel sorter 312 sorts the columns of the channel matrix so that a signal of a Tx antenna having the greatest channel size can be first detected.

The weight calculator 314 computes MMSE weight matrixes by using a channel matrix provided from the channel sorter 312. If the size of channel matrix is 4×4, sizes of the MMSE weight matrixes are respectively 3×4, 2×4, and 1×4, which are computed according to Equation 5 below:

$$W_1 = (H_1^H H_1 + \sigma^2 I)^{-1} H_1^H, H_1 = [h_2 h_3 h_4]$$

$$W_2 = (H_2^H H_2 + \sigma^2 I_2)^{-1} H_2^H, H_2 = [h_3 h_4]$$

$$W_3 = (H_3^H H_3 + \sigma^2 I_3)^{-1} H_3^H, H_3 = [h_4].$$ [Eqn. 5]

In Equation 5, $W_1$ denotes a 3×4 weight matrix, $W_2$ denotes a 2×4 weight matrix, $W_3$ denotes a 1×4 weight matrix, $h_k$ denotes a $k^{th}$ column of a channel matrix H, $H_k^H$ denotes a Hermitian matrix of a matrix $H_k$, $\sigma^2$ denotes a noise distribution, and I denotes a unit matrix. As expressed by Equation 5 above, the 3×4 weight matrix is computed by using a channel matrix composed of second, third, and fourth column vectors of a sorted channel matrix. The 2×4 weight matrix is computed by using a channel matrix composed of third and fourth column vector of a sorted matrix. The 1×4 weight matrix is computed by using a channel matrix composed of a fourth column vector of a sorted matrix.

The first signal detector 322 estimates Tx signal vectors with respect to all transmittable symbols for the first symbol x1 according to the MMSE method. Then, the first signal detector 322 configures a candidate group of a predetermined number of Tx signal vectors in ascending order of square Euclidean distances and then provides it to the second signal detector 324. For example, when a Tx signal is modulated by using a 16-QAM method, as shown in FIG. 1A, the first signal detector 322 computes 16 Tx signal vectors, configures a candidate group, and provides the candidate group to the second signal detector 324. The first signal detector 322 provides information on the square Euclidean distance to the first LLR generator 332. A structure of the first signal detector 322 will be described below in detail with respect to FIG. 4.

The second signal detector 324 estimates Tx signal vectors according to the MMSE method by substituting all transmittable symbols to the second symbol x2 in a candidate group provided from the first signal detector 322. Then, the second signal detector 324 configures a candidate group of a predetermined number of Tx signal vectors in ascending order of square Euclidean distances and provides the candidate group to the third signal detector 326. For example, when a Tx signal is modulated by using the 16-QAM method, as shown in FIG. 1B, the second signal detector 324 computes 48 Tx signal vectors, configures a candidate group, and provides the candidate group to the third signal detector 326. The second signal detector 324 provides information on the square Euclidean distance to the second LLR generator 334. A structure of the second signal detector 322 will be described below in detail with reference to FIG. 5.

The third signal detector 326 and the fourth signal detector 328 perform a function similar to the second signal detector 324, that is, a function for configuring a new candidate group when a previous signal detector provides the candidate group. However, the fourth signal detector 328 does not configure a candidate group. Structures of the third signal detector 326 and the fourth signal detector 328 will be described below in detail with reference to FIG. 6 and FIG. 7.

The first LLR generator 332 generates LLRs of all bits of the x1 symbols as expressed by Equation 6 below by using minimum square Euclidean distance values for the x1 symbols provided from the first signal detector 621, and then provides the generated LLRs to the second LLR generator 334:

$$LLR(b_{ti}) = \min_{x \in S_{t,i,0}} \|y - Hx\|^2 - \min_{x \in S_{t,i,1}} \|y - Hx\|^2 \quad [\text{Eqn. 6}]$$

$$i = 1, 2, \ldots, m$$

$$S_{t,i,0} = \{x \mid b_{ti} = 0\}$$

$$S_{t,i,1} = \{x \mid b_{ti} = 1\}$$

In Equation 6, $LLR(b_{ti})$ denotes an LLR of a $i^{th}$ bit of a $t^{th}$ symbol, x denotes a Tx signal vector, y denotes an Rx signal vector, H denotes a channel matrix, m denotes the number of Tx antennas, $S_{t,i,0}$ denotes a set of Tx signal vectors in which an $i^{th}$ bit of a $t^{th}$ symbol is 0, and $S_{t,i,1}$ denotes a set of Tx signal vectors in which an $i^{th}$ bit of a $t^{th}$ symbol is 1.

The second LLR generator 334 generates LLRs of all bits of the $x_1$ and $x_2$ symbols, as expressed by Equation 7 below, by using minimum square Euclidean distance values for the $x_1$ and $x_2$ symbols provided from the second signal detector 320, and then provides the generated LLRs to the third LLR generator 336:

$$LLR(b_{1i}) = \min_{x \in S_{1,i,0}} \|y - Hx\|^2 - \min_{x \in S_{1,i,1}} \|y - Hx\|^2 \quad [\text{Eqn. 7}]$$

$$LLR(b_{2i}) = \min_{x \in S_{2,i,0}} \|y - Hx\|^2 - \min_{x \in S_{2,i,1}} \|y - Hx\|^2$$

$$i = 1, 2, \ldots, m$$

In Equation 7, $LLR(b_{ki})$ denotes an LLR of an $i^{th}$ bit of a $k^{th}$ symbol, x denotes a Tx signal vector, y denotes an Rx signal vector, H denotes a channel matrix, m denotes the number of Tx antennas, $S_{t,i,0}$ denotes a set of Tx signal vectors in which an $i^{th}$ bit of a $t^{th}$ symbol is 0, and $S_{t,i,1}$ denotes a set of Tx signal vectors in which an $i^{th}$ bit of a $t^{th}$ symbol is 1.

If it is determined that LLRs of the x1 symbols need to be updated, the second LLR generator 334 updates the LLRs of the x1 symbols. The update is necessary in the following two cases, and the second LLR generator 334 may select either one of the two cases. In the first case, an LLR generated by the second LLR generator 334 is less than an LLR generated by the first LLR generator 332. In the second case, there is a Tx signal vector which is included in the Tx signal vectors estimated by the second signal detector 324 but is not included in Tx signal vectors estimated by the first signal detector 322.

The third LLR generator 336 generates LLRs of all bits of the $x_1$, $x_2$, and $x_3$ symbols, as expressed by Equation 8 below, by using the smallest square Euclidean distance values for the $x_1$, $x_2$, and $x_3$ symbols provided by the third signal detector 326:

$$LLR(b_{1i}) = \min_{x \in S_{1,i,0}} \|y - Hx\|^2 - \min_{x \in S_{1,i,1}} \|y - Hx\|^2 \quad [\text{Eqn. 8}]$$

$$LLR(b_{2i}) = \min_{x \in S_{2,i,0}} \|y - Hx\|^2 - \min_{x \in S_{2,i,1}} \|y - Hx\|^2$$

$$LLR(b_{3i}) = \min_{x \in S_{3,i,0}} \|y - Hx\|^2 - \min_{x \in S_{3,i,1}} \|y - Hx\|^2$$

$$i = 1, 2, \ldots, m.$$

In Equation 8, $LLR(b_{ki})$ denotes an LLR of an $i^{th}$ bit of a $k^{th}$ symbol, x denotes a Tx signal vector, y denotes an Rx signal vector, H denotes a channel matrix, m denotes the number of Tx antennas, $S_{t,i,0}$ denotes a set of Tx signal vectors in which an $i^{th}$ bit of a $t^{th}$ symbol is 0, and $S_{t,i,1}$ denotes a set of Tx signal vectors in which an $i^{th}$ bit of a $t^{th}$ symbol is 1.

If it is determined that LLRs of the $x_1$ and $x_2$ symbols need to be updated, the third LLR generator 336 updates the LLRs of corresponding symbols. The update is necessary in the following two cases, and the third LLR generator 336 may select either one of the two cases. In the first case, an LLR generated by the third LLR generator 336 is less than an LLR generated by the second LLR generator 334. In the second case, there is a Tx signal vector which is included in the Tx signal vectors estimated by the third signal detector 326 but is not included in Tx signal vectors estimated by the second signal detector 324.

The fourth LLR generator 338 generates LLRs of all bits of the $x_1$, $x_2$, $x_3$, and $x_4$ symbols, as expressed by Equation 9 below, by using the smallest square Euclidean distance values for the $x_1$, $x_2$, $x_3$, and $x_4$ symbols provided by the fourth signal detector 328:

$$LLR(b_{1i}) = \min_{x \in S_{1,i,0}} \|y - Hx\|^2 - \min_{x \in S_{1,i,1}} \|y - Hx\|^2 \quad [\text{Eqn. 9}]$$

$$LLR(b_{2i}) = \min_{x \in S_{2,i,0}} \|y - Hx\|^2 - \min_{x \in S_{2,i,1}} \|y - Hx\|^2$$

$$LLR(b_{3i}) = \min_{x \in S_{3,i,0}} \|y - Hx\|^2 - \min_{x \in S_{3,i,1}} \|y - Hx\|^2$$

$$LLR(b_{4i}) = \min_{x \in S_{4,i,0}} \|y - Hx\|^2 - \min_{x \in S_{4,i,1}} \|y - Hx\|^2$$

$$i = 1, 2, \ldots, m.$$

In Equation 9, $LLR(b_{ki})$ denotes an LLR of an $i^{th}$ bit of a $k^{th}$ symbol, x denotes a Tx signal vector, y denotes an Rx signal vector, H denotes a channel matrix, m denotes the number of Tx antennas, $S_{t,i,0}$ denotes a set of Tx signal vectors in which an $i^{th}$ bit of a $t^{th}$ symbol is 0, and $S_{t,i,1}$ denotes a set of Tx signal vectors in which an $i^{th}$ bit of a $t^{th}$ symbol is 1.

If it is determined that LLRs of the $x_1$, $x_2$, and $x_3$ symbols need to be updated, the fourth LLR generator 338 updates the LLRs of corresponding symbols. The update is necessary in the following two cases, and the fourth LLR generator 338 may select either one of the two cases. In the first case, an LLR generated by the fourth LLR generator 338 is less than an LLR generated by the third LLR generator 336. In the second case, there is a Tx signal vector which is included in the Tx signal vectors estimated by the fourth signal detector 328 but is not included in Tx signal vectors estimated by the third signal detector 326. Thus generated LLRs are provided to the channel decoder 208 via the de-interleaver 206 and are used in soft decision decoding of the channel decoder 208.

Figure 4:
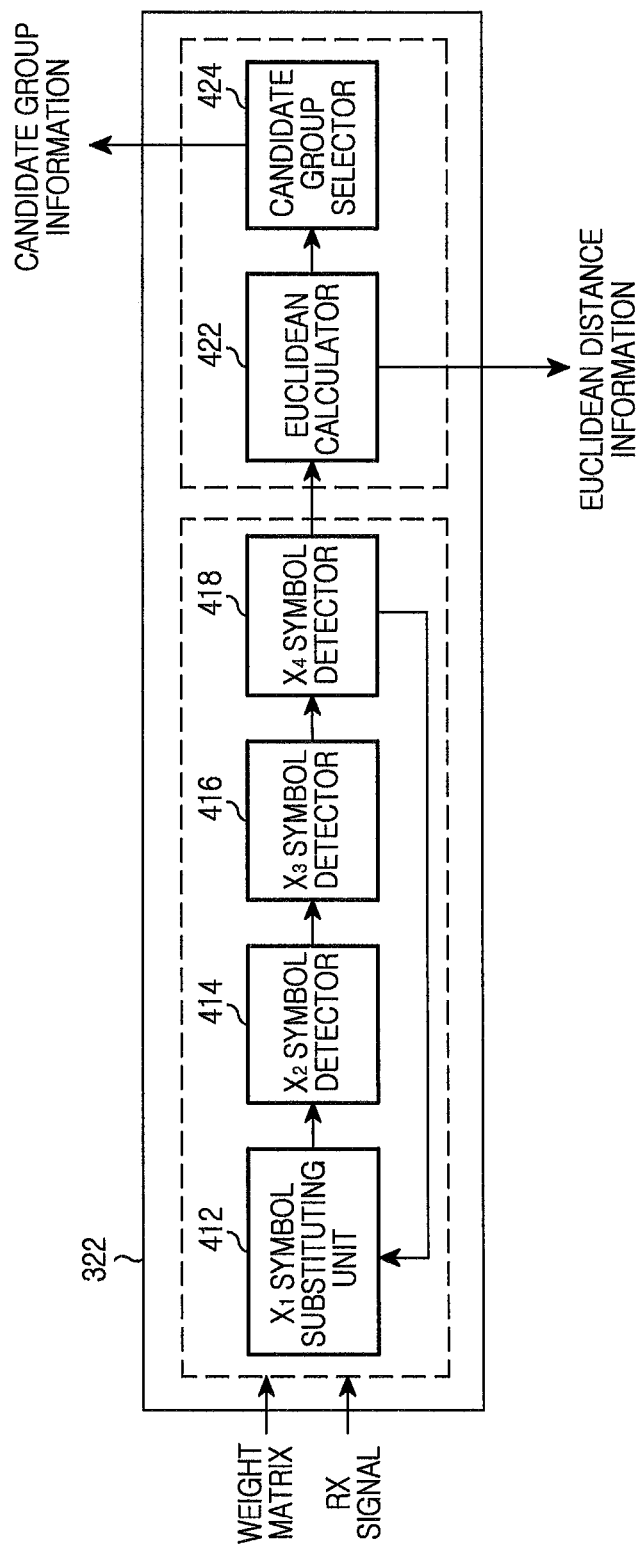
FIG. 4 is a block diagram illustrating a structure of a first signal detector of FIG. 3.

FIG. 4 is a block diagram illustrating a structure of the first signal detector 322 of FIG. 3.

Referring to FIG. 4, the first signal detector 322 includes an $x_1$ symbol substituting unit 412, an $x_2$ symbol detector 414, an $x_3$ symbol detector 416, an $x_4$ symbol detector 418, a Euclidean calculator 422, and a candidate group selector 424.

The $x_1$ symbol substituting unit 412 sequentially selects and outputs all transmittable symbols for a first Tx symbol (i.e., $x_1$ symbols).

The $x_2$ symbol detector 414 regards the symbol $x_1$ provided from the $x_1$ symbol substituting unit 412 as an interference and thus removes the symbol $x_1$ from an Rx signal ($\tilde{y}-h_1\hat{x}_1$), and multiples the interference-removed Rx signal and the 3×4 weight matrix. The $x_2$ symbol detector 414 performs a slicing operation on the multiplication result and thus computes an estimation value for Tx $x_2$ symbols.

The $x_3$ symbol detector 416 performs Successive Interference Cancellation (SIC) by using the estimated Tx symbol $x_2$, and multiples a signal resulted from the SIC and the 2×4 weight matrix. Further, the $x_3$ symbol detector 416 performs a sliding operation on the multiplication result and thus computes an estimation value for Tx $x_3$ symbols.

The $x_4$ symbol detector 418 performs SIC on the estimated Tx symbol $x_3$, and multiples a signal obtained by performing the SIC and the 1×4 weight matrix. Further, the $x_4$ symbol detector 418 performs a sliding operation on the multiplication result and thus obtains an estimation value for Tx $x_4$ symbols.

That is, with reference to each $x_1$ symbol output from the $x_1$ symbol substituting unit 412, signal detection is carried out by the $x_2$ symbol detector 414, the $x_3$ symbol detector 416, and the $x_4$ symbol detector 418 according to an MMSE-OSIC method. As a result, estimation Tx signal vectors are generated so that the number of generated vectors equals to a constellation size of each $x_1$ symbol.

The Euclidean calculator 422 calculates a square Euclidean distance between an Rx signal and each estimation Tx signal vector. The candidate group selector 424 compares distance values provided from the Euclidean calculator 422, and thus selects a predetermined number of Tx signal vectors in ascending order. Then, the candidate group selector 424 discards the $x_2$, $x_3$, and $x_4$ symbols from the selected Tx signal vectors and provides an $x_1$ candidate group to the second signal detector 320.

The Euclidean calculator 422 selects Euclidean distance values required in the calculation of LLR values of the $x_1$ symbols among the calculated square Euclidean distance values and then provides the selection result to the first LLR generator 332. That is, according to whether a value for each bit of the each $x_1$ symbol is 0 or 1, the Euclidean calculator 422 provides the two smallest square Euclidean distance values for each bit to the second LLR generator 334.

Figure 5:
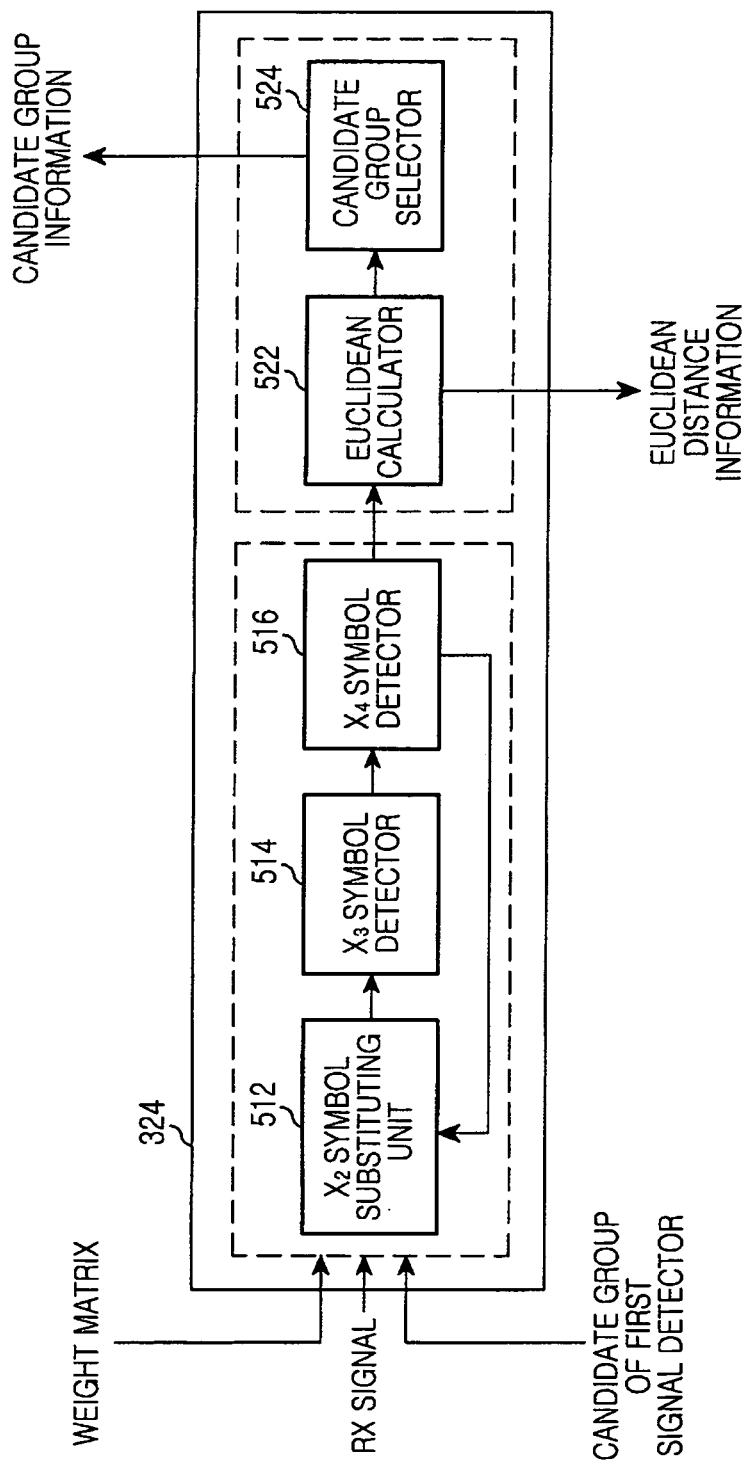
FIG. 5 is a block diagram illustrating a structure of a second signal detector of FIG. 3.

FIG. 5 is a block diagram illustrating a structure of the second signal detector 320 of FIG. 3.

Referring to FIG. 5, the second signal detector 320 includes an $x_2$ symbol substituting unit 512, an $x_3$ symbol detector 514, an $x_4$ symbol detector 516, a Euclidean calculator 522, and a candidate group selector 524.

The $x_2$ symbol substituting unit 512 computes an Rx signal vector in which interference with each symbol element included in an $x_1$ candidate group provided from the first signal detector 322 is removed, and then sequentially selects all transmittable $x_2$ symbols from the interference-removed Rx signal vector. For example, when three $x_1$ symbols are provided from the first signal detector 322, three Rx signal vectors are computed in which interference with each $x_1$ symbol is removed, and $x_2$ symbols are output as many as a modulation order of each Rx signal vector.

The $x_3$ symbol detector 514 performs SIC on a signal, which is provided from the $x_2$ symbol substituting unit 512 and in which interference with the $x_1$ symbols is removed, by using the selected $x_2$ symbols, and then multiplies a signal obtained by performing the SIC and the 2×4 weight matrix. According to the multiplication result, the $x_3$ symbol detector 514 estimates $x_3$ symbols by performing a sliding operation.

The $x_4$ symbol detector 516 performs SIC by using the estimated $x_3$ symbols, and multiplies a signal obtained by performing the SIC and the 1×4 weight matrix. Further, according to the multiplication result, the $x_4$ symbol detector 516 estimates an $x_4$ symbols by performing a sliding operation.

That is, with reference to each $x_2$ symbol output from the $x_2$ symbol substituting unit 512, signal detection is repeated as many as {number of $x_1$ symbols included in a candidate group}×{number of transmittable $x_2$ symbols} by the $x_3$ symbol detector 514 and the $x_4$ symbol detector 516 according to the MMSE-OSIC method. As a result, the second signal detector 324 can obtain estimation Tx signal vectors by as many as the number of times of repetitions. For example, if the number of $x_1$ symbols included in the candidate group is 3, and the number of transmittable $x_2$ symbols is 16, then the second signal detector 324 obtains 48 estimation Tx signal vectors.

The Euclidean calculator 522 calculates a square Euclidean distance between an Rx signal and each estimation Tx signal vector. The candidate group selector 524 compares square Euclidean distance values provided from the Euclidean calculator 522, and thus selects a predetermined number of Tx signal vectors in ascending order. Then, the candidate group selector 524 discards the $x_3$ and $x_4$ symbols from the selected estimation Tx signal vectors and provides a candidate group of the selected $x_1$ and $x_2$ symbols to the third signal detector 326.

The Euclidean calculator 522 selects square Euclidean distance values required in the calculation of LLR values of the $x_1$ and $x_2$ symbols among the calculated square Euclidean distance values and then provides the selection result to the second LLR generator 334. That is, according to whether a value for each bit of the $x_1$ and $x_2$ symbols is 0 or 1, the Euclidean calculator 522 provides the two smallest square Euclidean distance values for each bit to the second LLR generator 334.

Figure 6:
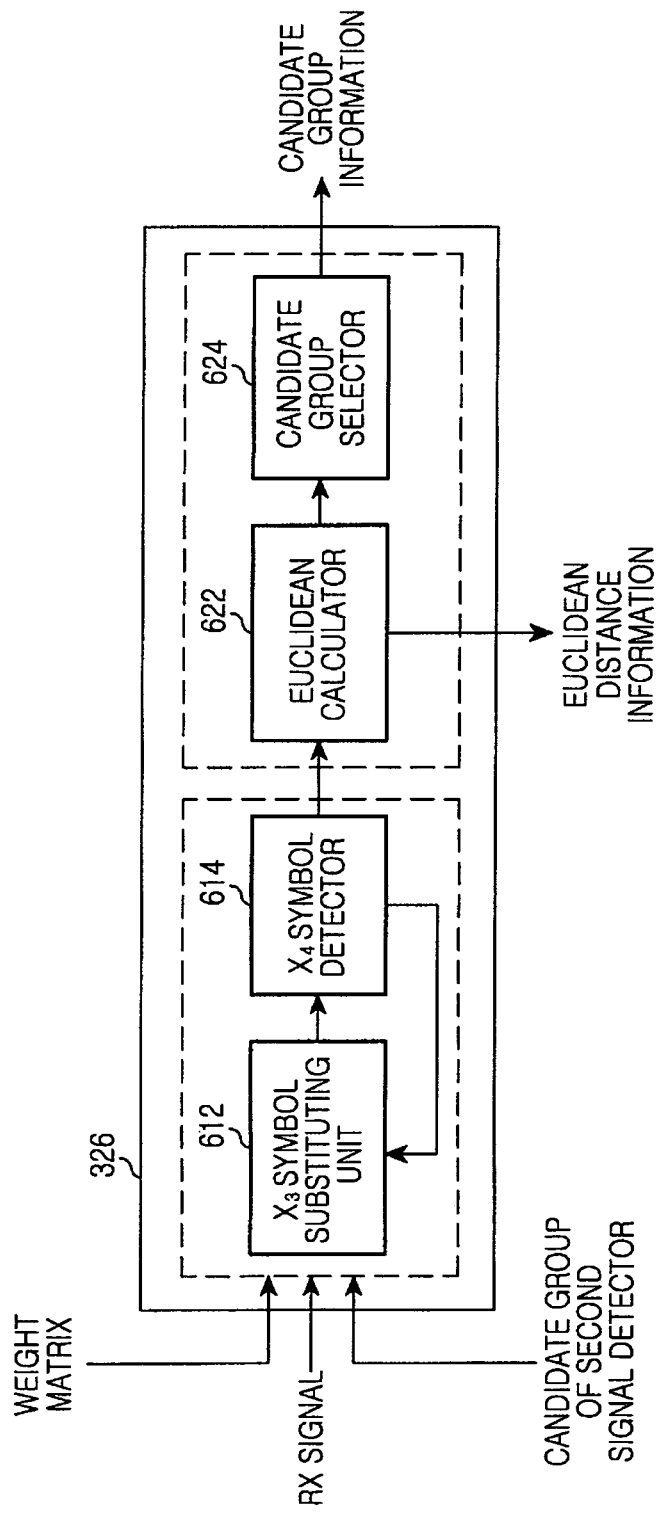
FIG. 6 is a block diagram illustrating a structure of a third signal detector of FIG. 3.

FIG. 6 is a block diagram illustrating a structure of the third signal detector 326 of FIG. 3.

Referring to FIG. 6, the third signal detector 326 includes an $x_3$ symbol substituting unit 612, an $x_4$ symbol detector 614, a Euclidean calculator 622, and a candidate group selector 624.

The $x_2$ symbol substituting unit 612 computes an Rx signal vector in which interference with $x_1$ and $x_2$ combinations included in a candidate group provided from the second signal detector 324 is removed, and then sequentially selects all transmittable $x_3$ symbols from the interference-removed Rx signal vector. For example, when three $x_1$ and $x_2$ combinations are provided from the second signal detector 324, three Rx signal vectors are computed in which interference with each combination is removed, and $x_3$ symbols are output as many as a modulation order of each Rx signal vector.

The $x_4$ symbol detector 614 performs SIC on an Rx signal vector which is provided from the $x_3$ symbol substituting unit 612 and in which interference with the $x_1$ and $x_2$ combinations is removed, by using the selected $x_3$ symbol, and then multiplies the Rx signal vector obtained by performing the SIC and the 1×4 weight matrix. According to the multiplication result, the $x_4$ symbol detector 614 estimates Tx $x_4$ symbols by performing a sliding operation.

That is, with reference to each x3 symbol output from the x3 symbol substituting unit 612, the third signal detector 326 repeats signal detection as many as {number of x1 and x2 combinations included in a candidate group}×{number of transmittable x3 symbols} by the x4 symbol detector 614 according to the MMSE-OSIC method. As a result, the third signal detector 326 can obtain estimation Tx signal vectors as many as the number of times of repetitions. For example, if the number of x1 and x2 combinations included in the candidate group is 3, and the number of transmittable x3 symbols is 16, then the third signal detector 326 obtains 48 estimation Tx signal vectors.

The Euclidean calculator 622 calculates a square Euclidean distance between an Rx signal and each estimation Tx signal vector. The candidate group selector 624 compares square Euclidean distance values provided from the E'uclidean calculator 622, and thus selects a predetermined number of Tx signal vectors in ascending order. Then, the candidate group selector 624 discards the $x_4$ symbols from the selected estimation Tx signal vectors and provides a candidate group of the selected $x_1$, $x_2$, and $x_3$ symbols to the fourth signal detector 328.

The Euclidean calculator 622 selects square Euclidean distance values required in the calculation of LLR values of the $x_1$, $x_2$, and $x_3$ symbols among the calculated square Euclidean distance values and then provides the selection result to the third LLR generator 336. That is, according to whether a value for each bit of the $x_1$, $x_2$, and $x_3$ symbols is 0 or 1, the Euclidean calculator 622 provides the two smallest square Euclidean distance values for each bit to the third LLR generator 336.

Figure 7:
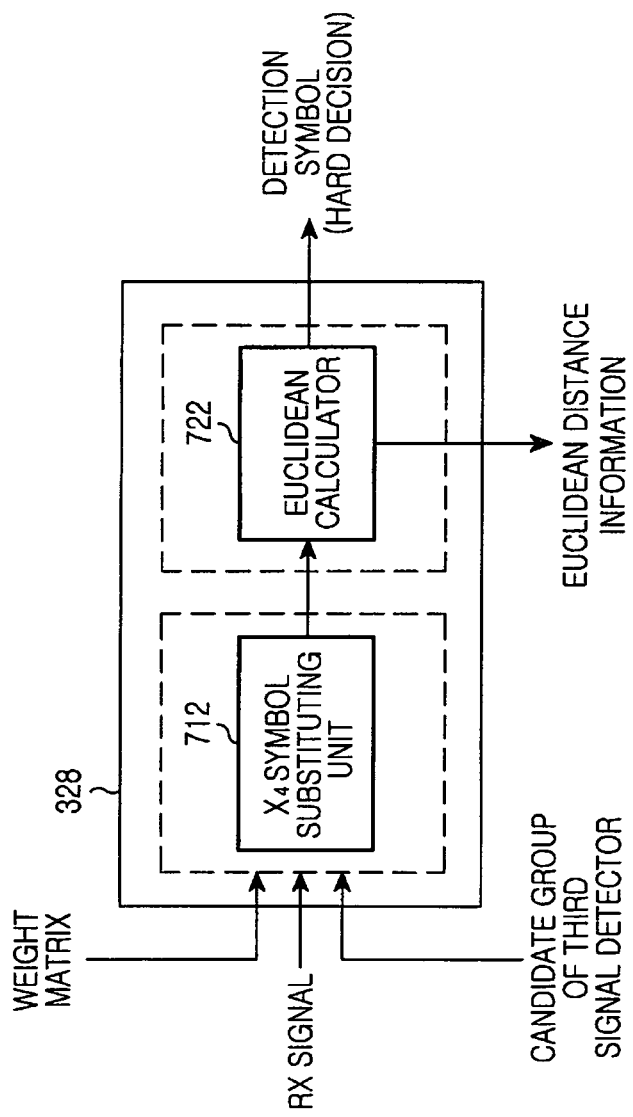
FIG. 7 is a block diagram illustrating a structure of a fourth signal detector of FIG. 3.

FIG. 7 is a block diagram illustrating a structure of the fourth signal detector 328 of FIG. 3.

Referring to FIG. 7, the fourth signal detector 328 includes an $x_4$ symbol substituting unit 712 and a Euclidean calculator 722.

The $x_4$ symbol substituting unit 712 substitutes transmittable $x_4$ symbols to $x_1$, $x_2$, and $x_3$ combinations included in a candidate group provided from the third signal detector 328, thereby forming Tx signal vectors. That is, the $x_4$ symbol substituting unit 712 configures estimation Tx signal vectors as many as {number of combinations included in the candidate group}×{number of transmittable $x_4$ symbols}.

The Euclidean calculator 722 calculates a square Euclidean distance between an Rx signal and each estimation Tx signal vector. When hard decision decoding is performed, the receiving end outputs a Tx signal vector having the shortest square Euclidean distance. When soft decision decoding is performed, the Euclidean calculator 722 selects Euclidean distance values required in the calculation of LLR values of $x_1$, $x_2$, $x_3$, and $x_4$ symbols from the calculated square Euclidean distance value, and then provides the selection result to the fourth LLR generator 338. That is, according to whether a value for each bit of the $x_1$, $x_2$, $x_3$, and x4 symbols is 0 or 1, the Euclidean calculator 722 provides the two smallest square Euclidean distance values for each bit to the fourth LLR generator 338.

Figure 8:
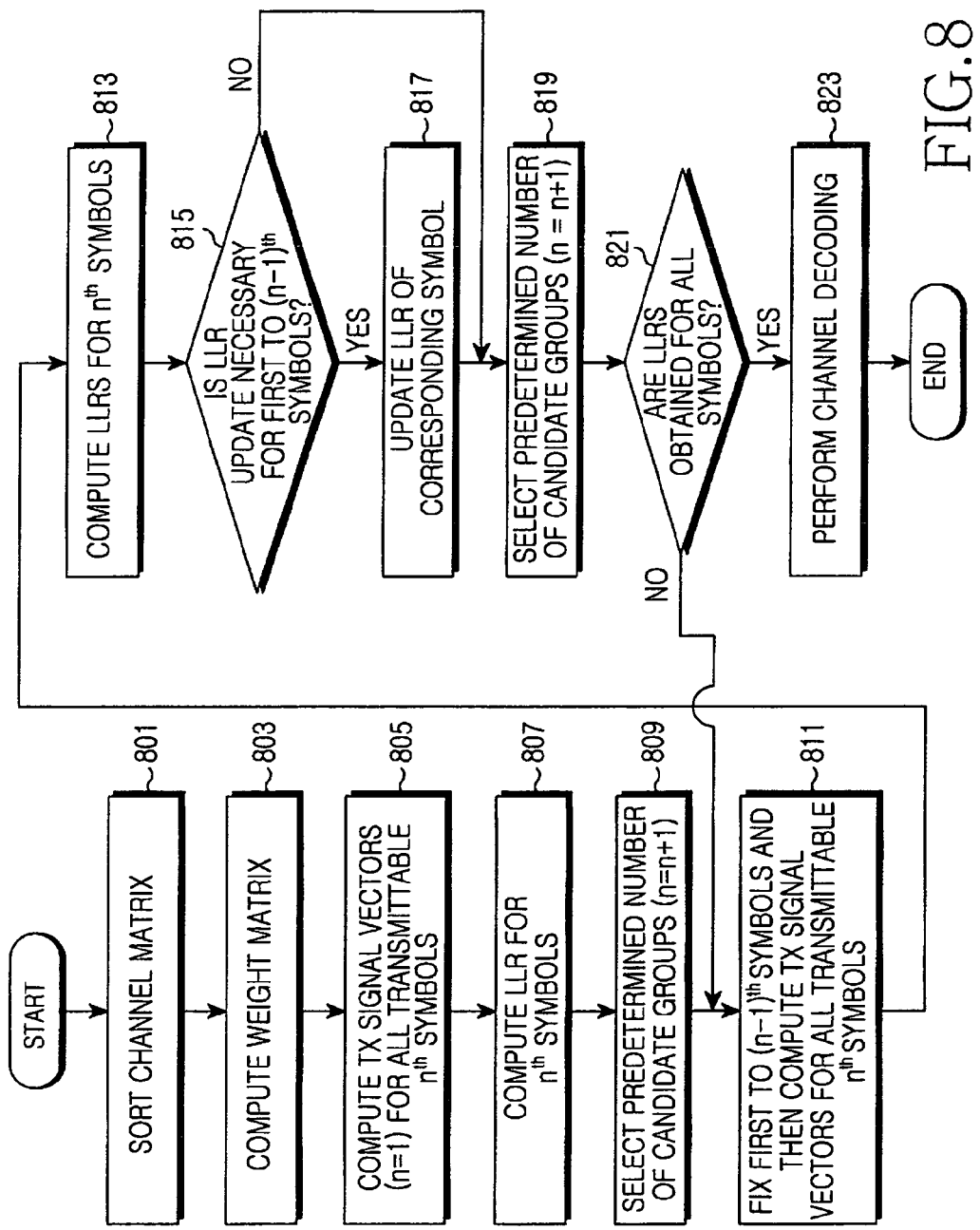
FIG. 8 is a flowchart illustrating a signal detection process performed in a receiving end of a MIMO wireless communication system according to the present invention.

FIG. 8 is a flowchart illustrating a signal detection process performed in a receiving end of a MIMO wireless communication system according to the present invention.

Referring to FIG. 8, in step 801, columns of a channel matrix are sorted according to a channel size. In other words, norm values of the columns of the channel matrix are computed, and the columns are sorted according to the size of the norm values.

In step 803, MMSE weight matrixes are computed. For example, the weight matrixes may be computed as expressed by Equation 5 above.

In step 805, Tx signal vectors are computed for all transmittable $n^{th}$ symbols according to the MMSE-OSIC method. Herein, n is initially set to 1. If n=1, estimation Tx signal vectors are estimated as the same number as a modulation order of a first symbol (i.e., $x_1$ symbol).

In step 807, LLRs for each bit of the $n^{th}$ symbols are generated. For example, the LLRs are computed as expressed by Equation 7 above.

In step 809, a predetermined number of Tx signal vectors are selected as a first candidate group. In this case, the Tx signal vectors are selected in ascending order of square Euclidean distances with respect to an Rx signal vector. Then, n is incremented by 1.

In step 811, first to $(n-1)^{th}$ symbols are fixed in the same manner as the selected Tx signal vectors, and then Tx signal vectors are estimated for all transmittable $n^{th}$ symbols according to the MMSE-OSIC method. The number of estimated Tx signal vectors is {number of selected Tx signal vectors}×{number of transmittable $n^{th}$ symbols}.

In step 813, LLRs of all bits of the first to $n^{th}$ symbols are generated. For example, the LLRs are computed as expressed by Equation 7 above if n=2, Equation 8 above if n=3, and Equation (9) above if n=4.

In step 815, it is determined that whether there is a need to update the LLRs of the first to $(n-1)^{th}$ symbols. The update is necessary in the following two cases, and the receiving end may select either one of the two cases. In the first case, an LLR generated in $n^{th}$ repetition is less than an LLR generated in $(n-1)^{th}$ repetition.

In the second case, there is a Tx signal vector which is included in Tx signal vectors estimated in $n^{th}$ repetition but is not included in Tx signal vectors estimated in $(n-1)^{th}$ repetition.

When LLR update is necessary, in step 817, an LLR of a to-be-updated symbol is updated to an LLR generated in $n^{th}$ repetition.

In step 819, a predetermined number of Tx signal vectors are selected as an $n^{th}$ candidate group. In this case, the Tx signal vectors are selected in ascending order of square Euclidean distances with respect to an Rx signal vector. Then, n is incremented by 1.

In step 821, it is checked whether LLRs are obtained for all symbols.

If the LLRs are obtained for all symbols, in step 823, soft decision decoding is performed by using the LLRs. Otherwise, if the LLRs are not obtained for all symbols, steps 811 to 821 are repeated.

The procedure of FIG. 8 is a signal receiving process performed when the receiving end performs soft decision decoding. On the other hand, when hard decision decoding is performed, all transmittable symbols for an $N^{th}$ symbol are substituted to a candidate group including as many as (N−1) symbols among a total of N symbols, and then soft decision decoding is performed by using a Tx symbol vector having the shortest square Euclidean distance with respect to the Rx signal vector. In this case, an LLR computation process may be omitted in the procedure of FIG. 8.

Figure 9A:
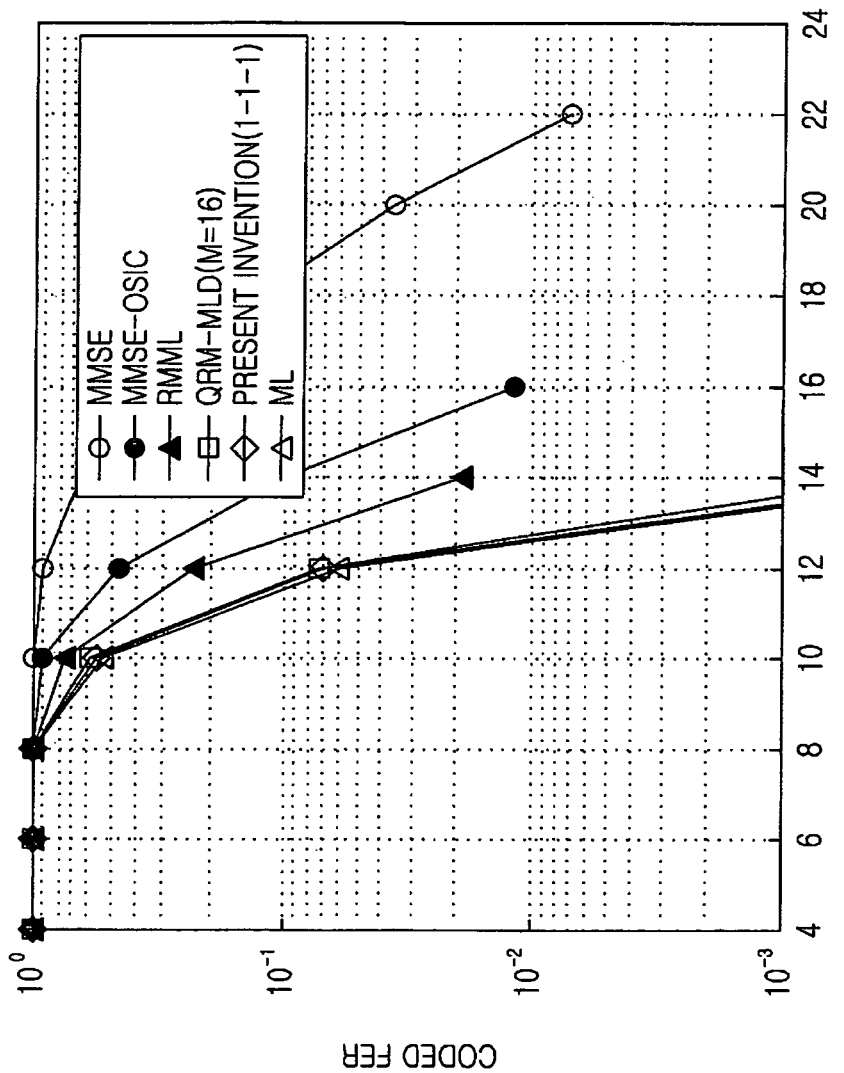
FIGS. 9A, 9B and 9C illustrate a throughput of a signal detection method according to the present invention.
Figure 9B:
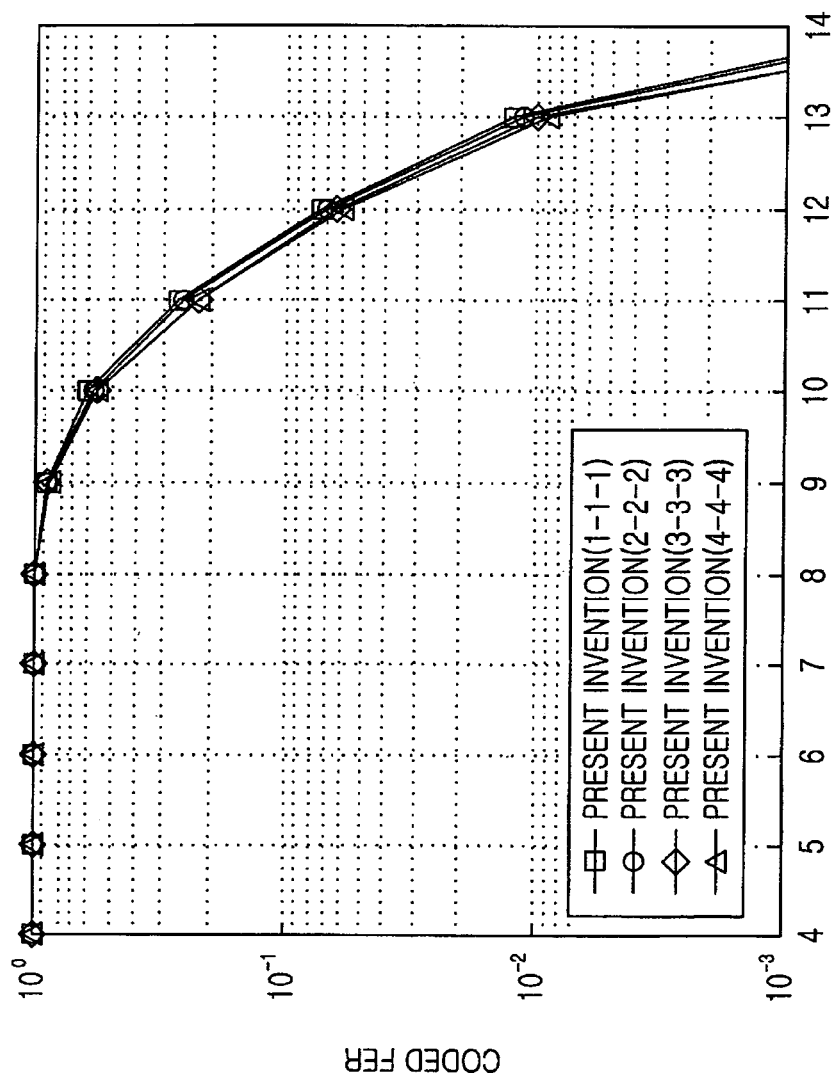
Figure 9C:
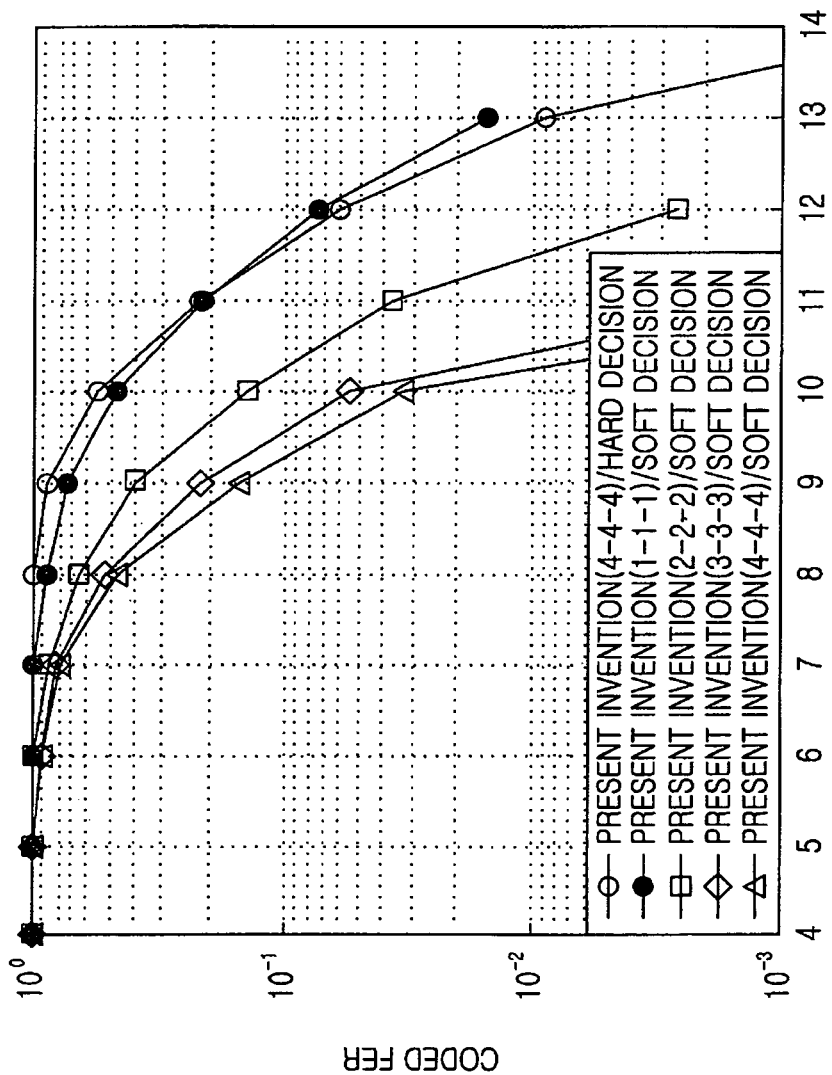

FIGS. 9A, 9B and 9C illustrate a throughput of a signal detection method according to the present invention. Specifically, FIGS. 9A, 9B and 9C illustrate graphs showing simulation results when an LLR generation method of the present invention is applied. In the simulation scenario, four Tx antennas and four Rx antennas are used, a modulation method is 16-QAM, a channel is i.i.d. (independent and identically distributed) Rayleigh fading Channel, and channel coding is determined to convolutional coding with a code rate of ½. In the graph of FIG. 9A, "present invention (k-k-k)" denotes that k Tx signal vectors are selected as a candidate group in first, second, and third repetitions.

FIG. 9A is a graph showing a throughput when a signal detection method of the present invention is applied to a hard decision system, in comparison with the case in which conventional signal detection methods are used. In the graph of FIG. 9A, a horizontal axis represents a bit energy-to-noise density (Eb/No), and a vertical axis represents a coded frame error rate (FER). As shown in FIG. 9A, the method of the present invention shows almost the same throughput as an ML method having an ideal throughput.

FIG. 9B is a graph showing a throughput according to the number of Tx signal vectors included in a candidate group when a signal detection method of the present invention is applied to a hard decision system. In the graph of FIG. 9B, a horizontal axis represents an Eb/No, and a vertical axis represents a coded FER. As shown in FIG. 9B, the similar throughput as an optimal throughput can be obtained even if the minimum number (i.e., one) of Tx signal vector is detected in every repetition.

FIG. 9C is a graph showing a throughput when a signal detection method of the present invention is applied to a soft decision system. In the graph of FIG. 9C, a horizontal axis represents an Eb/No, and a vertical axis represents a coded FER. When soft decision decoding is used as shown in FIG. 9C, an accuracy of LLR varies since the number of square Euclidean distance values is different according to the number of Tx signal vectors included in a candidate group. As a result, when the number of Tx signal vectors is 2 or more, the use of soft decision decoding results in further improved throughput than hard decision decoding.

Table 1 below shows the number of performing multiplication operations and the number of performing division operations of the present invention in comparison with the conventional method.

TABLE 1

|  | multiplication | division |
| --- | --- | --- |
| MMSE | 496 | 8 |
| MSE-OSIC | 612 | 18 |
| QRM-MLD (M = 16) | 2560 | 4 |
| Conventional RMML (4-3) | 3004 | 480 |
| R-MMSE-OSIC | 2906 | 180 |
| present invention (1-1-1) | 822 | 6 |
| present invention (2-2-2) | 1182 | 6 |
| present invention (3-3-3) | 1542 | 6 |
| present invention (4-4-4) | 1902 | 6 |

In comparison with QRM-MLD (M=16) showing almost the same throughput as the method of the present invention, as show in Table 1 above, an operational complexity is reduced by ⅓ in the method of the present invention when the candidate group has the minimum number of Tx signal vectors.

Accordingly, the present invention proposes a method of generating a candidate group when using a non-ML type signal detection scheme and a method of generating and updating an LLR, in a MIMO wireless communication system using an SM scheme. Therefore, a receiving end can obtain, with a low complexity, a throughput similar to that of an ML scheme.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for receiving signals by using a number of (N) receive (Rx) antennas in a multiple-input multiple-output (MIMO) wireless communication system, the apparatus comprising:
   a series of detectors including N number of detectors, the series of detectors comprising:
      a first detector configured to estimate first transmit (Tx) signal vectors respectively corresponding to first symbols that can be transmitted as a first symbol, configure a first candidate group including the first symbol according to a square Euclidean distance value between each of the first Tx signal vectors and a Rx signal vector, and provide the first candidate group to a next detector in the series;
      a set of intermediate detectors in the series, a number of the intermediate detectors equal to (N−2), each of the intermediate detectors configured to estimate intermediate Tx signal vectors respectively corresponding to combinations of a previous candidate group provided from a previous detector in the series and each symbol that can be transmitted, configure an intermediate candidate group, each candidate including one more symbol than candidates of the previous candidate group, based on the square Euclidean distance value between each of the intermediate Tx signal vectors and the Rx signal vector, and provide the intermediate candidate group to a next detector in the series; and
      a final detector configured to form Tx signal vectors by combining symbols that can be transmitted as an $N^{th}$ symbol with a candidate group provided from an $(N-2)^{th}$ detector in the set of intermediate detectors, and compute the square Euclidean distance value between each of the Tx signal vectors and the Rx signal vector.

2. The apparatus of claim 1, wherein, for hard decision decoding, the final detector is further configured to output a Tx signal vector having a shortest square Euclidean distance value with respect to the Rx signal vector among the Tx signal vectors.

3. The apparatus of claim 1, further comprising:
   a series of generators configured to generate a log-likelihood ratio (LLR) of symbols by using the square Euclidean distance value provided from each of the first detector, the intermediate detectors, and the final detector.

4. The apparatus of claim 3, wherein each of the generators are further configured to generate LLRs, and, if an LLR generated by a present generator is less than an LLR generated by a previous generator in the series of generators, update the LLR generated by the present generator to the LLR generated by the previous generator.

5. The apparatus of claim 3, wherein each of the generators are further configured to generate and update LLRs if there is a Tx signal vector which is estimated by a corresponding detector but is not estimated by a detector previous to the corresponding detector in the series of detectors.

6. The apparatus of claim 3, wherein each of the generators are further configured to generate the LLRs as expressed by Equation:

$$LLR(b_{ni}) = \min_{x \in S_{n,i,0}} \|y - Hx\|^2 - \min_{x \in S_{n,i,1}} \|y - Hx\|^2$$

$$i = 1, 2, \ldots, m$$

$$S_{n,i,0} = \{x \mid b_{ni} = 0\}$$

$$S_{n,i,1} = \{x \mid b_{ni} = 1\},$$

where $LLR(b_{ni})$ denotes an LLR of an $i^{th}$ bit of an $n^{th}$ symbol, x denotes a Tx signal vector, y denotes an Rx signal vector, H denotes a channel matrix, m denotes the number of Tx antennas, $S_{n,i,0}$ denotes a set of Tx signal vectors in which an $i^{th}$ bit of an $n^{th}$ symbol is 0, and $S_{n,i,1}$ denotes a set of Tx signal vectors in which an $i^{th}$ bit of an $n^{th}$ symbol is 1.

7. The apparatus of claim 1, further comprising:
a sorter configured to calculate norm values for respective columns of an estimated channel matrix, and sort the columns of the channel matrix in descending order of the norm values; and
a weight calculator configured to calculate minimum mean square error (MMSE) weight matrixes, each having a different size, by using the sorted channel matrix.

8. The apparatus of claim 7, wherein the first detector and the intermediate detectors are further configured to estimate symbols using an MMSE-order successive interference cancellation (OSIC) method.

9. The apparatus of claim 7, wherein, when the number of Rx antennas is 4, the MMSE weight matrix is expressed by Equation:

$$W_1 = (H_1^H H_1 + \sigma^2 I_1)^{-1} H_1^H, H_1 = [h_2 h_3 h_4]$$

$$W_2 = (H_2^H H_2 + \sigma^2 I_2)^{-1} H_2^H, H_2 = [h_3 h_4]$$

$$W_3 = (H_3^H H_3 + \sigma^2 I_3)^{-1} H_3^H, H_3 = [h_4],$$

where $W_1$ denotes a 3×4 weight matrix, $W_2$ denotes a 2×4 weight matrix, $W_3$ denotes a 1×4 weight matrix, $h_k$ denotes a $k^{th}$ column of a channel matrix H, $H_k^H$ denotes a Hermitian matrix of a matrix $H_k$, $\sigma^2$ denotes a noise distribution, and I denotes a unit matrix.

10. The apparatus of claim 1, wherein the first detector and the intermediate detectors each comprise:
a Euclidean calculator configured to calculate the square Euclidean distance value between each of the first Tx signal vectors or the intermediate Tx signal vectors and the Rx signal vector; and
a selector configured to select a predetermined number of the first Tx signal vectors or the intermediate Tx signal vectors having small distance values and to configure the first candidate group or the intermediate candidate group using the selected Tx signal vectors.

11. A signal detection method in a receiving end using a number of (N) receive (Rx) antennas in a multiple-input multiple-output (MIMO) wireless communication system, the method comprising:
estimating first transmit (Tx) signal vectors respectively corresponding to symbols that can be transmitted as a first symbol, and configuring a first candidate group including the first symbol according to a square Euclidean distance value between each of the first Tx signal vectors and a Rx signal vector;
performing (N−2) times of operations for estimating intermediate Tx signal vectors respectively corresponding to combinations of a previous candidate group and each symbol that can be transmitted, and for configuring an intermediate candidate group, each candidate including one more symbol than candidates of the previous candidate group, based on the square Euclidean distance value between each of the intermediate Tx signal vectors and the Rx signal vector; and
forming Tx signal vectors by combining symbols that can be transmitted as an $N^{th}$ symbol with an $(N-1)^{th}$ candidate group, and computing the square Euclidean distance value between each of the Tx signal vectors and the Rx signal vector.

12. The method of claim 11, further comprising performing hard decision decoding by using a Tx signal vector having a shortest square Euclidean distance value with respect to the Rx signal vector among the Tx signal vectors.

13. The method of claim 11, further comprising, when configuring the first candidate group or the intermediate candidate group, generating a log likelihood ratio (LLR) using the square Euclidean distance value.

14. The method of claim 13, further comprising:
when configuring the first candidate group or the intermediate candidate group, re-generating LLRs;
comparing the re-generated LLRs with the LLR generated when the previous candidate group is configured; and
if the re-generated LLR is less than the LLR generated when the previous candidate group is configured, updating the re-generated LLR to the LLR generated when the previous candidate group is configured.

15. The method of claim 13, further comprising:
when configuring the first candidate group or the intermediate candidate group, checking an existence of a new Tx signal vector which is estimated to configure a current candidate group but is not estimated to configure the previous candidate group; and
if the new Tx signal vector exists, re-generating and updating LLRs.

16. The method of claim 13, wherein the LLRs are generated as expressed by Equation:

$$LLR(b_{ni}) = \min_{x \in S_{n,i,0}} \|y - Hx\|^2 - \min_{x \in S_{n,i,1}} \|y - Hx\|^2$$

$$i = 1, 2, \ldots, m$$

$$S_{n,i,0} = \{x \mid b_{ni} = 0\}$$

$$S_{n,i,1} = \{x \mid b_{ni} = 1\},$$

where $LLR(b_{ni})$ denotes an LLR of an $i^{th}$ bit of an $n^{th}$ symbol, x denotes a Tx signal vector, y denotes an Rx signal vector, H denotes a channel matrix, m denotes the number of Tx antennas, $S_{n,i,0}$ denotes a set of Tx signal vectors in which an $i^{th}$ bit of an $n^{th}$ symbol is 0, and $S_{n,i,1}$ denotes a set of Tx signal vectors in which an $i^{th}$ bit of an $n^{th}$ symbol is 1.

17. The method of claim 11, further comprising:
calculating norm values for respective columns of an estimated channel matrix, and sorting the columns of the channel matrix in descending order of the norm values; and calculating minimum mean square error (MMSE) weight matrixes, each having a different size, by using the sorted channel matrix.

18. The method of claim 17, wherein the estimating of the Tx signal vector in configuring the candidate group further comprises:
estimating using an MMSE-Order Successive Interference Cancellation (OSIC) method.

19. The method of claim 17, wherein, when the number of Rx antennas is 4, the MMSE weight matrix is expressed by Equation:

$$W_1=(H_1^H H_1+\sigma^2 I_1)^{-1}H_1^H, H_1=[h_2 h_3 h_4]$$

$$W_2=(H_2^H H_2+\sigma^2 I_2)^{-1}H_2^H, H_2=[h_3 h_4]$$

$$W_3=(H_3^H H_3+\sigma^2 I_3)^{-1}H_3^H, H_3=[h_4],$$

where $W_1$ denotes a 3×4 weight matrix, $W_2$ denotes a 2×4 weight matrix, $W_3$ denotes a 1×4 weight matrix, $h_k$ denotes a $k^{th}$ column of a channel matrix H, $H_k^H$ denotes a Hermitian matrix of a matrix $H_k$, $\sigma^2$ denotes a noise distribution, and I denotes a unit matrix.

20. The method of claim 11, wherein configuring the first candidate group or the intermediate candidate group comprises:
calculating the square Euclidean distance value between each of the first Tx signal vectors or the intermediate Tx signal vectors and the Rx signal vector;
selecting a predetermined number of the first Tx signal vectors or the intermediate Tx signal vectors having small distance values; and
configuring the first candidate group or the intermediate candidate group using the selected Tx signal vectors.

* * * * *